(12) United States Patent
Rusch

(10) Patent No.: US 6,442,933 B2
(45) Date of Patent: Sep. 3, 2002

(54) DEVICE FOR CATALYTIC EXHAUST GAS PURIFICATION

(75) Inventor: Klaus Rusch, Litzendorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/781,207

(22) Filed: Feb. 12, 2001

Related U.S. Application Data

(63) Continuation of application No. PCT/DE99/02350, filed on Jul. 30, 1999.

(30) Foreign Application Priority Data

Aug. 11, 1998 (DE) .......................................... 198 36 355

(51) Int. Cl.$^7$ ................................................. F01N 3/00
(52) U.S. Cl. ............................. 60/286; 60/296; 60/303; 60/322; 60/324; 181/221; 181/261
(58) Field of Search ........................... 60/286, 296, 299, 60/300, 303, 317, 322, 323; 181/259, 260, 261, 212, 221, 222

(56) References Cited

U.S. PATENT DOCUMENTS

| | | | | |
|---|---|---|---|---|
| 4,050,903 A | * | 9/1977 | Bailey et al. | 23/288 |
| 4,426,844 A | * | 1/1984 | Nakano | 60/295 |
| 4,851,015 A | * | 7/1989 | Wagner et al. | 55/20 |
| 5,209,062 A | * | 5/1993 | Vollenweider | 60/280 |
| 5,357,755 A | * | 10/1994 | Gillingham et al. | 60/288 |
| 5,412,946 A | * | 5/1995 | Oshima et al. | 60/286 |
| 5,431,893 A | | 7/1995 | Hug et al. | |
| 5,542,249 A | * | 8/1996 | Health | 60/293 |

FOREIGN PATENT DOCUMENTS

| | | |
|---|---|---|
| DE | 19741199 A1 | 4/1999 |
| EP | 0690212 A1 | 1/1996 |
| EP | 0779415 A1 | 6/1997 |

* cited by examiner

Primary Examiner—Thomas Denion
Assistant Examiner—Binh Tran
(74) Attorney, Agent, or Firm—Laurence A. Greenberg; Werner H. Stemer; Gregory L. Mayback

(57) ABSTRACT

A device for catalytic removal of a pollutant from an exhaust gas of a combustion system, particularly, a fossil-fired power plant or an internal combustion engine, includes an exhaust-gas duct for carrying exhaust gas, a reagent, a muffler having an injection space and a mixing space for mixing the reagent with the exhaust gas, an injection device for introducing the reagent into the exhaust gas in the injection space, at least one catalytic converter disposed in the exhaust-gas duct, and mixers disposed at least one of before and after the injection space with respect to a direction of flow of the exhaust gas. The mixers define a distance therebetween, and the distance is matched to a frequency of sound to be damped in the exhaust gas. According to the invention, the injection chamber and the downstream mixture chamber are embodied as a muffler in order to reduce the emissions of sound while enabling the production of a device having a compact structure.

13 Claims, 2 Drawing Sheets

DEVICE FOR CATALYTIC EXHAUST GAS PURIFICATION

CROSS-REFERENCE TO RELATED APPLICATION

This application is a continuation of copending International Application No. PCT/DE99/02350, filed Jul. 30, 1999, which designated the United States.

BACKGROUND OF THE INVENTION

Field of the Invention

The invention lies in the field of catalytic converters. The invention relates to a device for the catalytic removal of a pollutant from the exhaust gas of a combustion system, such as a fossil-fired power plant or an internal combustion engine. The combustion system has an exhaust-gas duct for carrying the exhaust gas and an injection device for introducing a reagent into the exhaust gas in an injection space of the exhaust-gas duct. A catalytic converter is installed in the exhaust-gas duct. The injection space and a mixing space are configured as a muffler. The mixing space is connected downstream if appropriate and is provided for the purpose of mixing the reagent with the exhaust gas.

A catalytic removal device is disclosed, for example, in European Patent Application 0 779 415 A1.

When a fossil fuel is burnt in a combustion system, considerable quantities of pollutants, such as nitrogen oxides (NOx), hydrocarbons, carbon monoxide, and oxides of sulfur, are formed. If the combustion temperatures are high enough, dioxins and furans are also formed. These pollutants can enter the environment through the exhaust gas from the combustion system. A combustion system of this kind can include a boiler system or a fossil-fired power plant, for example, or even an internal combustion engine.

Due to strict legal requirements that limit emissions of the above mentioned pollutants, it is necessary to treat the exhaust gas from combustion systems for reducing the quantity of pollutants it contains. Many different catalytic converters have been developed for such a purpose. Thus, for example, the prior art includes DeNOx catalysts for reducing the quantity of nitrogen oxides. Such catalysts convert the nitrogen oxides (NOx) contained in the exhaust gas by a reducing agent, generally ammonia or urea, into environmentally neutral nitrogen and water by the process known as selective catalytic reduction (SCR). The reducing agent is introduced into the exhaust gas ahead of the catalytic converter in the direction of flow of the exhaust gas. The reducing agent then enters the catalytic converter, as far as possible as a homogeneous mixture with the nitrogen oxides contained in the exhaust gas. It is also possible in this context for a number of catalytic converters to be disposed in series.

For reducing the quantity of pollutants in the exhaust gas of an Otto engine, the prior art includes catalysts containing noble metals, for example, on which hydrocarbons and carbon monoxide together with nitrogen oxides are converted into carbon dioxide, nitrogen, and/or water.

The above mentioned DeNOx catalyst can be used to remove nitrogen oxides from the exhaust gas of a diesel engine. Here, urea is preferably used. The urea is injected into the flow of exhaust gas in a manner appropriate to the application. With such an electronically controlled diesel catalytic converter, it is possible to reduce considerably the level of nitrogen oxides in the exhaust gas of the diesel engine.

An SCR device for the catalytic removal of NOx in the exhaust gas of a combustion system is first of all required to effect a significant and effective reduction in NOx emissions. It is also generally required to reduce sound emissions. The sound results from the operation of the combustion system and represents a problem for the environment. At the same time, there is a demand for minimizing the space required. To reduce sound emissions, provision has hitherto been made for the installation of a separate muffler in the exhaust-gas duct. The separate muffler made it possible to reduce sound emissions to below the permissible limits. However, there are noticeable disadvantages with the muffler solution, to wit, additional costs, an increased pressure drop, and a larger space requirement.

SUMMARY OF THE INVENTION

It is accordingly an object of the invention to provide a device for catalytic exhaust-gas purification that overcomes the hereinafore-mentioned disadvantages of the heretofore-known devices of this general type and that requires no unnecessary space for a separate muffler and further reduces sound emissions.

The invention is based on the consideration that the objective can be achieved if different functions can be combined in an already existing component.

With the foregoing and other objects in view, there is provided, in accordance with the invention, a device for catalytic removal of a pollutant from an exhaust gas of a combustion system, including an exhaust-gas duct for carrying exhaust gas, a reagent, a muffler having an injection space and a mixing space for mixing the reagent with the exhaust gas, an injection device for introducing the reagent into the exhaust gas in the injection space, at least one catalytic converter disposed in the exhaust-gas duct, and mixers disposed at least one of before and after the injection space with respect to a direction of flow of the exhaust gas, the mixers defining a distance therebetween, the distance matched to a frequency of sound to be damped in the exhaust gas. Particularly, the combustion system is a fossil-fired power plant or an internal combustion engine.

An advantage of such solution is that it is possible to construct an SCR catalytic converter system for the exhaust gas of a combustion system in a very compact and economical manner because the injection and mixing space are configured as a muffler. For noise damping, the injection space and/or the mixing space can then be lined with a perforated plate or a thin, flexible single- or double-layer plate. The injection space and/or the mixing space is/are preferably provided with a sound-deadening lining.

In accordance with another feature of the invention, the mixing space is disposed downstream of the injection space.

In accordance with an added feature of the invention, the perforated plate, the flexible single-layer plate, and/or the flexible double-layer plate are backed with a sound-absorbing material selected from the group consisting of steel wool, ceramic wool, steel web, and fiber web.

In accordance with an additional feature of the invention, the exhaust gas duct has an inlet part and a 180° deflection for the exhaust gas, and the 180° deflection is disposed between the inlet part and the at least one catalytic converter, and including at least one of a reflection damper and a absorption damper disposed in a region of the 180° deflection.

In accordance with yet another feature of the invention, the injection space and the mixing space form a constructional or structural unit.

In accordance with yet a further feature of the invention, the structural unit has an inflow side and an outflow side and at least one of the inflow side and the outflow side is a pipe resonator.

In accordance with yet an added feature of the invention, the 180° deflection is disposed on the outflow side of the structural unit.

In accordance with a concomitant feature of the invention, the injection device has a nozzle and a jacketing tube in a region at the nozzle, and the jacketing tube is aligned in a direction of flow of the exhaust gas.

Other features that are considered as characteristic for the invention are set forth in the appended claims.

Although the invention is illustrated and described herein as embodied in a device for catalytic exhaust-gas purification, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
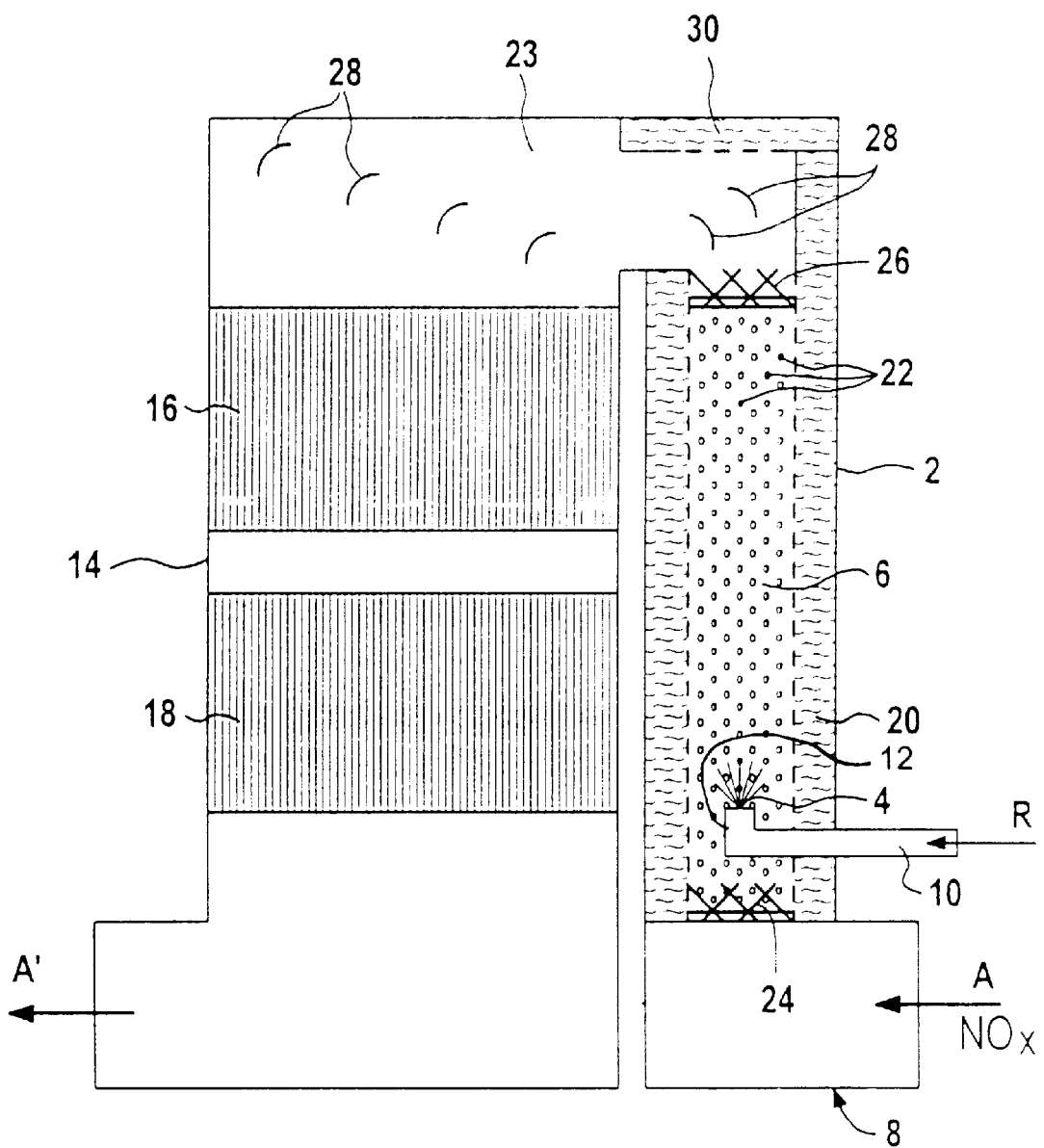
FIG. 1 is a diagrammatic cross-sectional view of a vertical SCR system with a vertical injection and mixing space and 180° deflection of the exhaust gas according to the invention.

In all the figures of the drawing, sub-features and integral parts that correspond to one another bear the same reference symbol in each case.

Referring now to the figures of the drawings in detail and first, particularly to FIG. 1 thereof, there is shown exhaust gas A containing NOx, that is preliminarily deflected through 90° in the exhaust-gas duct 8 and passed from below into a structural unit 2 that, in turn, is provided with a sound-deadening lining 20 and a perforated plate 22. An injection device 10 with a nozzle 12 leads into the injection space 4. The injection device 10 is provided for introducing a reducing agent or reagent R into the exhaust gas A in the injection space 4. The downstream mixing space 6 serves to mix the reagent R introduced with the exhaust gas A. Ammonia or urea can be used as a reagent R, for example. Generally speaking, the reducing agent or reagent R can be injected in a pure form (liquid or gaseous) or in solution (e.g., with water or steam). The tubular structural unit 2 shown in FIG. 1, including the injection space 4 and the mixing space 6, is vertical. At the outlet of the structural unit 2, the exhaust gas A undergoes a 180° deflection in a deflection space 23 and, in the downstream space 14 or SCR reactor, enters two SCR catalytic converters 16, 18 in series. The purified exhaust gas A' leaves the device after a 90° deflection. Mixers 24 and 26 are disposed at the inlet and outlet of the structural unit 2. To facilitate the 180° deflection, baffles 28 are provided in the upper deflection space 23.

In the embodiment of FIG. 1, a sound-deadening effect is achieved in various ways.

First, the abovementioned lining of the injection and mixing space 4, 6 with the perforated plate 22 can be provided. Instead of the perforated plate 22, it is also possible to use a thin, flexible plate. The perforated plate 22 is backed with an absorbent material, such as steel wool, ceramic wool, steel web, or fiber web, as a lining 20.

Second, reflection damping is provided between the mixers 24, 26. Thus, the distance between the mixers 24, 26 is matched to the sound frequency to be damped.

Third, reflection damping is provided at the 180° deflection of the exhaust gas A between the structural unit 2 and the SCR reactor 14. The reflection damping is shown in the form of a sound-deadening lining 30 on the upper inner wall.

In the embodiment, further deflections are possible in the region of the injection and mixing space 4 and 6. In such a case, the distances between the deflections should be chosen such that a damping effect is achieved through resonance.

With regard to FIG. 1, the deflection does not necessarily have to be exactly 180°. Any deflection that allows reflection of the sound into upstream parts of the system can be employed. With appropriate lining of the deflection, upstream sound reflection is possible even with deflections of less than 90°.

Figure 2:
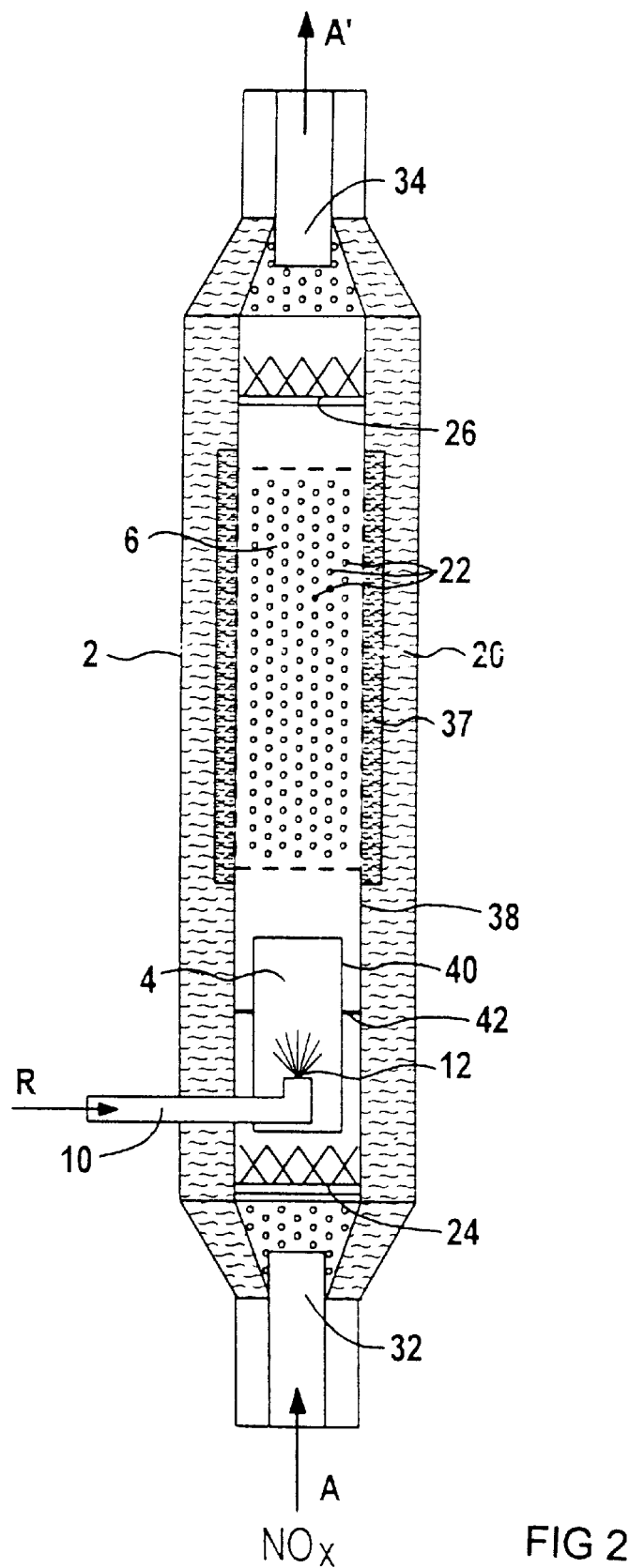
FIG. 2 is a diagrammatic cross-sectional view of a tubular injection and mixing space with various refinements for sound deadening according to the invention.

The embodiment of FIG. 2 illustrates a number of possibilities for the embodiment of the combined structural unit 2 containing the injection space 4 and the mixing space 6. The features illustrated need not necessarily all be present at the same time.

The inflow side and the outflow side of the structural unit 2 of FIG. 2 are constructed as pipe resonators 32 and 34. They are tuned to the sound frequency to be damped. The structural unit 2 is provided with a sound-deadening lining 20 over the entire length of the tube. Its material and thickness are likewise matched to the sound frequency to be damped. In the region of the mixing space 6 there is a perforated plate 22.

Here, the size of the holes and the length of the section incorporating the perforated plate 22 are matched to the sound frequency to be damped. Within the structural unit 2 there is a thin-walled inner tube 38. The tube 38 can be two-layers with an air gap between the two layers. Here, too, the distance between the two mixers 24 and 26 is matched to the sound frequency.

Reference numeral 37 denotes a backing of the perforated plate 22. The backing 37 is an abrasion-resistant material that is temperature-stable and does not allow any discharge through the perforated plate 22.

In the embodiment in FIG. 2, a jacketing tube 40 is provided in the region of the nozzle 12. The tube 40 is thin-walled. It can also have a two-layer construction with an air gap between the layers. A holder 42 in the interior holds he jacketing tube 40. The jacketing tube is aligned in the direction of flow of the exhaust gas A.

I claim:

1. A device for catalytic removal of a pollutant from an exhaust gas of a combustion system, comprising:

an exhaust-gas duct for carrying exhaust gas;

a reagent;

a muffler having an injection space and a mixing space for mixing said reagent with the exhaust gas;

an injection device for introducing said reagent into the exhaust gas in said injection space;

at least one catalytic converter disposed in said exhaust-gas duct;

mixers disposed at least one of before and after said injection space with respect to a direction of flow of the exhaust gas, said mixers defining a distance therebetween, said distance matched to a frequency of sound to be damped in the exhaust gas; and at least one of said injection space and said mixing space being lined with at least one of a group consisting of a perforated plate, a thin, flexible single-layer plate, and a thin, flexible double-layer plate.

2. The device according to claim 1, wherein said mixing space is disposed downstream of said injection space.

3. The device according to claim 1, wherein said perforated plate is backed with a sound-absorbing material selected from the group consisting of steel wool, ceramic wool, steel web, and fiber web.

4. The device according to claim 1, wherein said flexible single-layer plate is backed with a sound-absorbing material selected from the group consisting of steel wool, ceramic wool, steel web, and fiber web.

5. The device according to claim 1, wherein said flexible double-layer plate is backed with a sound-absorbing material selected from the group consisting of steel wool, ceramic wool, steel web, and fiber web.

6. The device according to claim 1, wherein said injection space and said mixing space form a structural unit.

7. The device according to claim 6, wherein said structural unit has an inflow side and an outflow side and at least one of said inflow side and said outflow side is a pipe resonator.

8. The device according to claim 1, wherein at least one of said injection space and said mixing space has a sound-deadening lining.

9. The device according to claim 1, wherein:
said injection device has a nozzle and a jacketing tube in a region at said nozzle; and
said jacketing tube is aligned in a direction of flow of the exhaust gas.

10. A device for catalytic removal of a pollutant from an exhaust gas of a combustion system, comprising:
an exhaust-gas duct for carrying exhaust gas;
a reagent;
a muffler having an injection space and a mixing space for mixing said reagent with the exhaust gas;
an injection device for introducing said reagent into the exhaust gas in said injection space;
at least one catalytic converter disposed in said exhaust-gas duct;
mixers disposed at least one of before and after said injection space with respect to a direction of flow of the exhaust gas, said mixers defining a distance therebetween, said distance matched to a frequency of sound to be damped in the exhaust gas; and
said exhaust gas duct having an inlet part and a 180° deflection for the exhaust gas, and said 180° deflection being disposed between said inlet part and said at least one catalytic converter, and including at least one of a reflection damper and a absorption damper disposed in a region of said 180° deflection.

11. A device for catalytic removal of a pollutant from an exhaust gas of a combustion system, comprising:
an exhaust-gas duct for carrying exhaust gas;
a reagent;
a muffler having an injection space and a mixing space for mixing said reagent with the exhaust gas;
an injection device for introducing said reagent into the exhaust gas in said injection space;
at least one catalytic converter disposed in said exhaust-gas duct;
mixers disposed at least one of before and after said injection space with respect to a direction of flow of the exhaust gas, said mixers defining a distance therebetween, said distance matched to a frequency of sound to be damped in the exhaust gas;
said exhaust gas duct having an inlet part and a 180° deflection for the exhaust gas;
said 180° deflection being disposed between said inlet part and said at least one catalytic converter;
said injection space and said mixing space forming a structural unit having an inflow side and an outflow side;
at least one of said inflow side and said outflow side being a pipe resonator; and
said 180° deflection being disposed on said outflow side of said structural unit.

12. A device for catalytic removal of a pollutant from an exhaust gas of a fossil-fired power plant, comprising:
an exhaust-gas duct for carrying exhaust gas;
a reagent;
a muffler having an injection space and a mixing space for mixing said reagent with the exhaust gas;
an injection device for introducing said reagent into the exhaust gas in said injection space;
at least one catalytic converter disposed in said exhaust-gas duct;
mixers disposed at least one of before and after said injection space with respect to a direction of flow of the exhaust gas, said mixers defining a distance therebetween,
said distance matched to a frequency of sound to be damped in the exhaust gas; and
at least one of said injection space and said mixing space being lined with at least one of a group consisting of a perforated plate, a thin, flexible single-layer plate, and a thin, flexible double-layer plate.

13. A device for catalytic removal of a pollutant from an exhaust gas of an internal combustion engine, comprising:
an exhaust-gas duct for carrying exhaust gas;
a reagent;
a muffler having an injection space and a mixing space for mixing said reagent with the exhaust gas;
an injection device for introducing said reagent into the exhaust gas in said injection space;
at least one catalytic converter disposed in said exhaust-gas duct;
mixers disposed at least one of before and after said injection space with respect to a direction of flow of the exhaust gas, said mixers defining a distance therebetween, said distance matched to a frequency of sound to be damped in the exhaust gas; and
at least one of said injection space and said mixing space being lined with at least one of a group consisting of a perforated plate, a thin, flexible single-layer plate, and a thin, flexible double-layer plate.

* * * * *